April 8, 1941.  R. E. SPAULDING  2,237,716
METHOD OF TREATING WELDS AND PRODUCT
Filed June 15, 1940
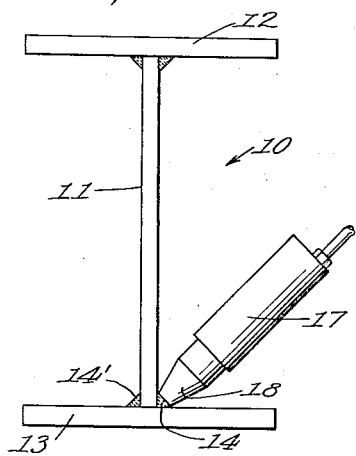
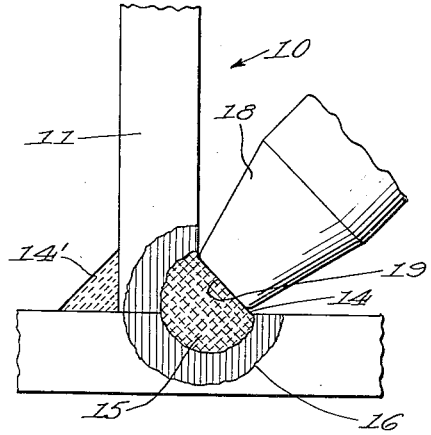
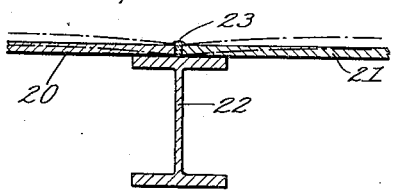
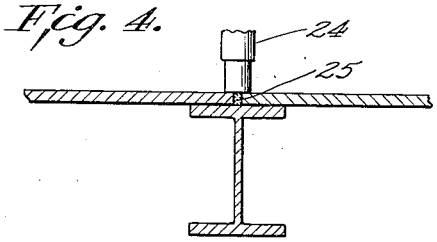
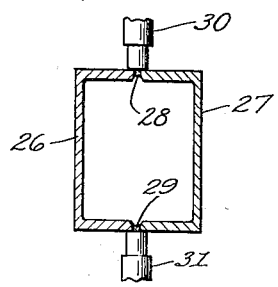
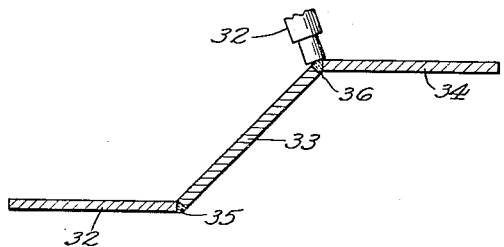
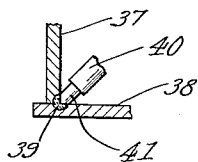
Inventor
Ralph E. Spaulding.
By Cushman Darby & Cushman
Attorneys Patented Apr. 8, 1941

2,237,716

UNITED STATES PATENT OFFICE 2,237,716

METHOD OF TREATING WELDS AND PRODUCT

Ralph E. Spaulding, Jacksonville, Fla., assignor to Aetna Iron & Steel Co., Jacksonville, Fla., a corporation of Florida Application June 15, 1940, Serial No. 340,858

1 Claim. (Cl. 148—12)

This invention relates to a method whereby electric or gas fusion welds, either autogenous or with filler metal, may be made in avoidance of "locked-in" stresses or shrinkage stresses which ordinarily produce warpage in the united metal members.

In welding, the application of intense heat to a localized area causes that area to expand. Expansion of this highly heated localized area cannot take place in a normal manner, that is, in all directions in accordance with the temperature change times the coefficient of thermoexpansion, and, therefore, deformation of the weld area occurs. Both the modulus of elasticity and the yield point are very low at high temperatures, thus facilitating its deformation. A corresponding thermal expansion cannot quickly take place in the members being welded together, due to the larger areas of relatively colder metal surrounding the weld area and, therefore, the deformation results in the shorting of the axis of this area. On this highly heated area is customarily deposited weld or filler metal in liquid form, this added metal becoming an integral part of the highly heated base metal.

As this area (base metal plus filler metal, if any), cools to the temperature of the original piece, it attempts to shrink in all directions in accordance with the natural law of thermal contraction. However, as heretofore mentioned, this area has undergone deformation and its axis, longitudinally of the weld, has become permanently shortened with respect to the larger areas of parent metal. That is to say, the unit axial length of the weld area in its highly heated state is the same as the normal unit axial length of parent metal at room temperature. As the entire areas become again of one uniform temperature, the weld area is found to be under very high stress in tension and the surrounding parent metal is found to be under stress in compression, the relation of the respective tension and compressive stresses being determined by the inverse relative areas of the weld zone to the remaining areas. The result is "locked-in" stresses accompanied by a shortening in the length of the material where welded, with consequent warping of the assembly.

To prevent this tendency to distort, I treat the weld area during original cooling, that is to say, while it is trying to shrink and is prevented from doing so by the superior bulk and strength of the relatively colder adjacent metal. This treatment comprises subjecting the welded area to compacting force which may be applied in various ways. The welded body may be vibrated as a whole. Preferably, vibratory compressive force is applied to the weld face, as by a pneumatic hammer, or pressure may be otherwise applied. In the treatment of an elongated weld in the use of a pneumatic hammer, the treatment is progressive longitudinally of the weld. The treatment is applied while the weld area is still in plastic state during original cooling and is not necessarily continued during the entire cooling period, but only during such part of the period as may be found necessary to accomplish the desired result, namely, to elongate the weld zone so that upon cooling it will have the original length of the base metal. The compacting action resulting from the hammering, pressing or vibrating treatment causes the weld area to do what it cannot do by itself, namely, to undergo a deformation counter to that which took place while the weld was being formed. This being accomplished, there remain no "locked-in" stresses of any consequence, nor is there any shrinkage or warpage of the welded assembly. Additionally, tests show that welds treated in accordance with the invention are stronger than untreated welds. The treatment may be applied to any welds on any metals which may be effectively united by fusion welding.

In the accompanying drawing I have shown the application of the invention in various situations involving the formation of a welded joint between adjacent lateral edges of elongated members, here assumed to be of steel.

Figure 1 illustrates a manner of treating a weld of a built-up I-beam, the beam being shown in end elevation.

Figure 2 is an enlarged partial view of the base portion of the structural member of Figure 1 and illustrates the heat condition in the weld zone.

Figure 3 is a sectional view of deck plates welded to a girder in accordance with the prior practice.

Figure 4 is similar to that of Figure 3, but showing the application of the present invention.

Figure 5 is a transverse section of a hollow beam formed of channels with treatment in accordance with the present invention.

Figure 6 is a sectional view of an assembly comprising angularly related plates with welds treated in accordance with the present invention, and Figure 7 is a transverse section of a built-up L-beam constituted by autogenously welded elements with treatment in accordance with the present invention.

Referring to the drawing, and first to Figures 1 and 2, reference numeral 10 designates an I-beam including a web 11 and top and bottom flanges 12 and 13. Reference numeral 14 designates filler metal which as shown in Figure 2 forms an integrated zone 15 with the adjacent base metal this zone being indicated as at yellow or orange heat and extending half-way across the web 11. The zone 15 is surrounded by a zone 16 at red heat. These heat conditions are merely illustrative and it is to be understood that the new method can be carried out at any time during original cooling while the weld zone is in plastic condition. A pneumatic hammer 17 has a head 18 with a flat end face 19 of circular contour having a diameter somewhat less than the width of the weld face. The hammer is traversed longitudinally of the weld area, following the welding operator, the head striking the face of the weld in overlapping strokes. The vibratory effect compacts or settles and elongates the weld area so that upon cooling of the whole, the longitudinal axis of the base metal in this area is the same in length as before the welding operation. In this manner "locked-in" stresses and consequent shrinkage and warpage are avoided. Desirably, weld 14' is simultaneously treated. Ordinarily the welds are longitudinally continuous.

The welded assembly is distinguishable by the fact that the fillet has a smooth face as the result of the vibrating action, and, as above stated, the weld is appreciably stronger than one formed in the absence of the new treatment. There are, therefore, present the outstanding advantages of greater strength, absence of "locked-in" stresses, the retention of original length, and the avoidance of warpage and of a consequent straightening operation.

Figure 3 shows deck plates 20 and 21 welded together and to the top flange of an I-beam 22 through a fillet 23 in acordance with prior practice. The fillet protrudes upwardly, necessitating a finishing operation. Furthermore, during cooling the plates become bowed as indicated by the dot and dash lines and have to be subsequently flattened. In the practice of the present invention, as illustrated in Figure 4, the action of hammer 24 not only finishes the filler metal 25 flush with the deck plates, but also prevents any tendency of the plates to bulge.

In Figure 5 reference numerals 26 and 27 designate channels welded together to form a hollow beam, the welds incorporating filler metal as at 28 and 29 and the weld areas being preferably simultaneously treated as by the hammers 30 and 31.

In Figure 6 reference numerals 32, 33 and 34 represent plates united in angular relation by welds 35 and 36, the latter being shown as undergoing treatment by a hammer 32. The avoidance of warping in shapes of this nature, as accomplished by the practice of the present invention, is particularly important in this instance, since the warpage which would occur in the absence of treatment is extremely difficult to correct.

In Figure 7 reference numerals 37 and 38 designate plates united autogeneously in rectangular relation by a weld zone 39 which is treated in accordance with the present invention by a hammer 40 having a head 41 with angular faces at the same angle as the angle between members 37 and 38.

The drawing, of course, indicates only a few of the many possible applications of the invention in the production of welded assemblies. The invention extends to the treatment of all welds of substantial extent and to the resulting products.

I claim:

In the method of forming an elongated joint between two elongated steel members having elongated adjacent edges to be joined, said method comprising moving a welding electrode along said edges to form a weld, the step which comprises following the electrode along the weld with compacting means acting on the weld area while the latter is still plastic under the original heat of welding, whereby to elongate the weld area and thereby prevent shrinkage stresses in the welded assembly.

RALPH E. SPAULDING.